J. W. GAMBLE.
VALVE.
APPLICATION FILED JAN. 24, 1911.

1,050,938.

Patented Jan. 21, 1913.

WITNESSES:

INVENTOR
Joseph W. Gamble
BY
Edmonds & Edmonds
ATTORNEYS

UNITED STATES PATENT OFFICE.

JOSEPH W. GAMBLE, OF PHILADELPHIA, PENNSYLVANIA, ASSIGNOR TO HARRISON SAFETY BOILER WORKS, OF PHILADELPHIA, PENNSYLVANIA, A CORPORATION OF PENNSYLVANIA.

VALVE.

1,050,938.  Specification of Letters Patent.  Patented Jan. 21, 1913.

Application filed January 24, 1911. Serial No. 604,375.

*To all whom it may concern:*

Be it known that I, JOSEPH W. GAMBLE, a citizen of the United States, residing at Philadelphia, in the county of Philadelphia and State of Pennsylvania, have invented certain new and useful Improvements in Valves, of which the following is a specification.

This invention relates to valves and particularly to valves of the type known as exhaust relief valves and commonly employed in the exhaust lines of steam systems to open and permit the escape of steam if the pressure within the piping rises too high.

The object of the invention is to effect certain improvements in the construction of valves of this type to the end that greater safety is secured by reducing to a minimum the possibility of the valve failing to open and relieve against abnormal conditions when the pressure in the system exceeds a predetermined amount.

Relief valves in steam systems as a general rule operate only at long intervals; but it is of the greatest importance that they should be in condition to operate and should operate when the conditions arise under which their operation to relieve excessive pressure is desired. During such long intervals, the movable member of a relief valve is very apt to become stuck to its seat, and as a result, will not move to open the valve though a pressure considerably greater than that for which the valve was set to open be reached. Such failure of the relief valve to prevent the existence of abnormal conditions in the system might disturb the operation of the apparatus or even lead to breakage of the parts. This invention is directed to the provision of means for reducing the danger incident to such sticking of the movable valve-member and involves the provision of supplemental valve-member or a plurality of such members adapted to open in response to a pressure higher than that for which the relief-valve proper is set and when so opened to allow the escape of steam and thus restore normal conditions.

I have illustrated in the accompanying drawings two embodiments of the invention which may be employed.

Figure 1:
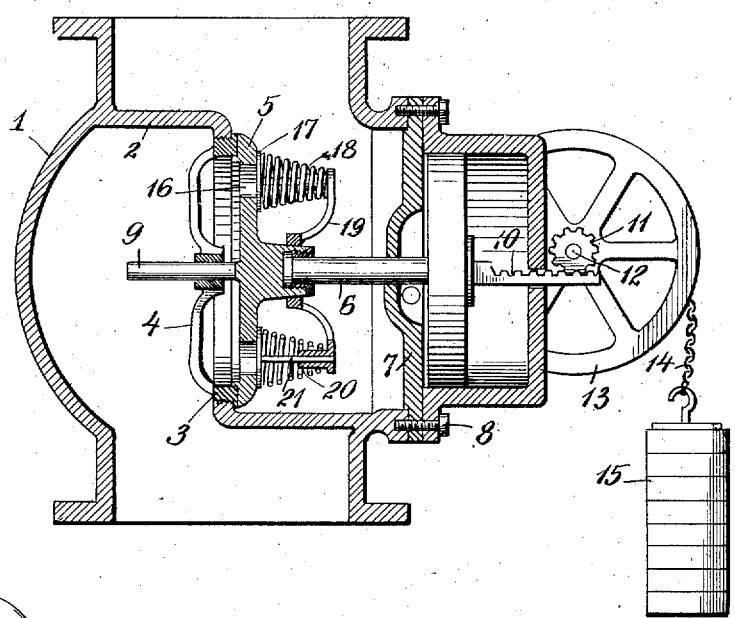
Figure 3:
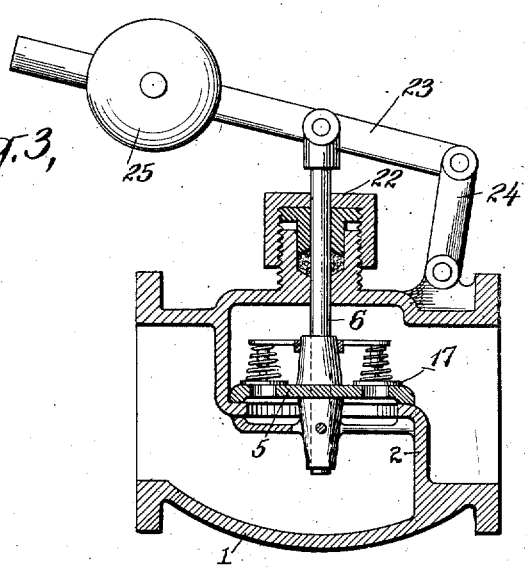
Figure 2:
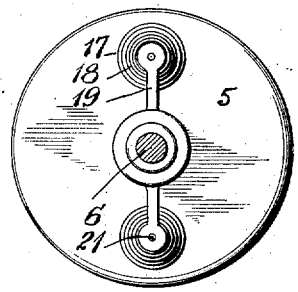

In these drawings Figure 1 is a section of a relief-valve constructed in accordance with the invention, Fig. 2 is a sectional detail view thereof and Fig. 3 is a sectional view of a modified form of valve.

Referring first to Figs. 1 and 2, 1 indicates the casing of the valve and 2 is a transverse wall cast integral therewith. This wall 2 has a threaded circular opening therein in which fits an annular member 3 having a brace 4 extending across the same. The movable member of the valve is shown at 5, this being secured to a stem 6 which passes through an opening in a plate 7 secured by means of screws 8 over an opening provided in the casing 1. On the other side of the member 5 a post 9 is secured thereto and passes through an opening in brace 4 so as to guide the member 5 in its movements. Beyond the plate 7 the stem 6 has a rack 10 formed thereon and this rack meshes with a pinion 11 carried by a shaft 12 which is mounted for rotation in bearings secured to the casing of the valve. On this shaft 12 is a wheel 13 having one end of a chain 14 secured thereto, the chain extending around a portion of the periphery of the wheel and having an adjustable weight 15 suspended therefrom.

The movable valve-member 5 has a plurality of openings 16 therethrough, two such openings being shown in the present instance. Each of these openings is normally closed by a valve disk 17 held upon its seat so as to close the opening 16 by a spring 18. Secured on the hub of the valve-member 5 is a spider 19 the arms of which sustain the springs 18 under pressure. Each arm 19 may have a boss 20 formed thereon provided with a central opening to receive and guide the stem 21 of the valve disk 17. The springs 18 are of such tension that they will hold the valve disks 17 closed until the pressure within the valve is substantially in excess of that at which the valve-member 5 should open. This latter pressure may be adjusted within certain limits by increasing or decreasing the weight 15. The opening at the lower end of the casing 1 as shown in Fig. 1, is the inlet opening of the valve and therefore when the valve is in use there is always a pressure upon the valve-member 5 tending to raise it from its seat. If a certain pressure upon the valve-member 5 is exceeded, this pressure being predetermined by the weight 15, the valve-member 5 should be moved from its seat, turning shaft 12 and raising weight 15 so that steam might escape through the opening in the wall 2 and the excessive pressure thus relieved. Since such valve-members 5 are required to operate only at long intervals, it sometimes happens that they become stuck to their seats and if means were not provided to guard against it, a pressure might occur within the valve substantially in excess of that at which the valve-member should open and such opening will not take place. With the valve shown in Fig. 1, if such conditions arise the supplementary valves 17 will be raised from their seats against the tension of the springs 18 so as to allow steam to escape through the openings 16 and thus relieve the abnormal pressure conditions. It will thus be seen that a supplementary valve, or plurality of supplementary valves, is provided which is called into action only when the main valve-member fails to open in response to conditions which should cause its opening, this supplementary valve being arranged to open only when a pressure within the valve is reached which is substantially in excess of that at which the valve-member should open.

In Fig. 3 a somewhat different form of relief-valve is shown provided with two supplementary valves constructed as shown in Figs. 1 and 2. In this form of relief-valve the stem 6 of the valve-member 5 extends through a stuffing box 22 and is pivotally connected to a lever 23 whose end is pivotally connected to a link 24 pivotally mounted at its opposite end on the casing 1. The lever 23 has a weight 25 adjustably mounted thereon. With this form of valve a predetermined pressure within the valve should raise the valve-member 5 and with it the lever 23 and weight 25, but if the valve-member 5 fails to open in response to the pressure which should cause its opening and the pressure within the valve thereafter increases, the supplementary valves 17 will be raised from their seats so as to reëstablish normal conditions.

Having described my invention what I claim as new therein and desire to secure by Letters Patent of the United States is:

A relief valve comprising the combination of a casing, a valve-seat therein, a main valve-member, adjustable yielding means for holding the member upon its seat except when a predetermined pressure is exceeded, said member having a plurality of openings therethrough, supplementary valve-members each normally closing one of said openings, and springs holding the supplementary valve-members in position to close said openings and yielding to permit movement thereof unaccompanied by movement of the main valve-member when said predetermined pressure is exceeded and the main valve member does not move, substantially as described.

This specification signed and witnessed this 20th day of January, 1911.

JOSEPH W. GAMBLE.

Witnesses:
ROBERT G. CLIFTON,
W. ATWOOD MEHARG.

---

Correction in Letters Patent No. 1,050,938.

It is hereby certified that in Letters Patent No. 1,050,938, granted January 21, 1913, upon the application of Joseph W. Gamble, of Philadelphia, Pennsylvania, for an improvement in "Valves," the assignee was erroneously described and specified as a "corporation of Pennsylvania" whereas said assignee should have been described and specified as a *copartnership of Pennsylvania;* and that the said Letters Patent should be read with this correction therein that the same may conform to the record of the case in the Patent Office.

Signed and sealed this 25th day of February, A. D., 1913.

[SEAL.]

C. C. BILLINGS,
*Acting Commissioner of Patents.* turning shaft 12 and raising weight 15 so that steam might escape through the opening in the wall 2 and the excessive pressure thus relieved. Since such valve-members 5 are required to operate only at long intervals, it sometimes happens that they become stuck to their seats and if means were not provided to guard against it, a pressure might occur within the valve substantially in excess of that at which the valve-member should open and such opening will not take place. With the valve shown in Fig. 1, if such conditions arise the supplementary valves 17 will be raised from their seats against the tension of the springs 18 so as to allow steam to escape through the openings 16 and thus relieve the abnormal pressure conditions. It will thus be seen that a supplementary valve, or plurality of supplementary valves, is provided which is called into action only when the main valve-member fails to open in response to conditions which should cause its opening, this supplementary valve being arranged to open only when a pressure within the valve is reached which is substantially in excess of that at which the valve-member should open.

In Fig. 3 a somewhat different form of relief-valve is shown provided with two supplementary valves constructed as shown in Figs. 1 and 2. In this form of relief-valve the stem 6 of the valve-member 5 extends through a stuffing box 22 and is pivotally connected to a lever 23 whose end is pivotally connected to a link 24 pivotally mounted at its opposite end on the casing 1. The lever 23 has a weight 25 adjustably mounted thereon. With this form of valve a predetermined pressure within the valve should raise the valve-member 5 and with it the lever 23 and weight 25, but if the valve-member 5 fails to open in response to the pressure which should cause its opening and the pressure within the valve thereafter increases, the supplementary valves 17 will be raised from their seats so as to reëstablish normal conditions.

Having described my invention what I claim as new therein and desire to secure by Letters Patent of the United States is:

A relief valve comprising the combination of a casing, a valve-seat therein, a main valve-member, adjustable yielding means for holding the member upon its seat except when a predetermined pressure is exceeded, said member having a plurality of openings therethrough, supplementary valve-members each normally closing one of said openings, and springs holding the supplementary valve-members in position to close said openings and yielding to permit movement thereof unaccompanied by movement of the main valve-member when said predetermined pressure is exceeded and the main valve member does not move, substantially as described.

This specification signed and witnessed this 20th day of January, 1911.

JOSEPH W. GAMBLE.

Witnesses:
ROBERT G. CLIFTON,
W. ATWOOD MEHARG.

---

Correction in Letters Patent No. 1,050,938.

It is hereby certified that in Letters Patent No. 1,050,938, granted January 21, 1913, upon the application of Joseph W. Gamble, of Philadelphia, Pennsylvania, for an improvement in "Valves," the assignee was erroneously described and specified as a "corporation of Pennsylvania" whereas said assignee should have been described and specified as a *copartnership of Pennsylvania;* and that the said Letters Patent should be read with this correction therein that the same may conform to the record of the case in the Patent Office.

Signed and sealed this 25th day of February, A. D., 1913.

[SEAL.]

C. C. BILLINGS,
*Acting Commissioner of Patents.*

It is hereby certified that in Letters Patent No. 1,050,938, granted January 21, 1913, upon the application of Joseph W. Gamble, of Philadelphia, Pennsylvania, for an improvement in "Valves," the assignee was erroneously described and specified as a "corporation of Pennsylvania" whereas said assignee should have been described and specified as a *copartnership of Pennsylvania;* and that the said Letters Patent should be read with this correction therein that the same may conform to the record of the case in the Patent Office.

Signed and sealed this 25th day of February, A. D., 1913.

[SEAL.]

C. C. BILLINGS,

*Acting Commissioner of Patents.*